June 20, 1950  G. L. ROBINSON ET AL  2,512,114
TRACTOR ATTACHMENT
Filed Sept. 9, 1946

INVENTOR
GARNER LAVERNE ROBINSON
ELDON LEWIS ROBINSON
BY
Fetherstonhaugh & Co.
ATTORNEY Patented June 20, 1950

UNITED STATES PATENT OFFICE 2,512,114

TRACTOR ATTACHMENT

Garner Laverne Robinson, Milner, British Columbia, and Eldon Lewis Robinson, Aldergrove, British Columbia, Canada Application September 9, 1946, Serial No. 695,742

2 Claims. (Cl. 97—47)

This invention relates to an attachment for tractors which may be used for many purposes in farming, land clearing, ditch digging or the like.

An object of the present invention is the provision of an attachment for tractors of very simple construction which is a general purpose implement.

Another object is the provision of an attachment or implement of the nature described which may be adjusted to any desired angle in relation to the tractor, and which may be reversed so that it will function when the tractor moves in either direction.

A further object is the provision of a tractor attachment which may be used for excavating, land levelling, grading, loosening soil, root pulling, sub-surface cultivating, filling, and other purposes.

Figure 1:
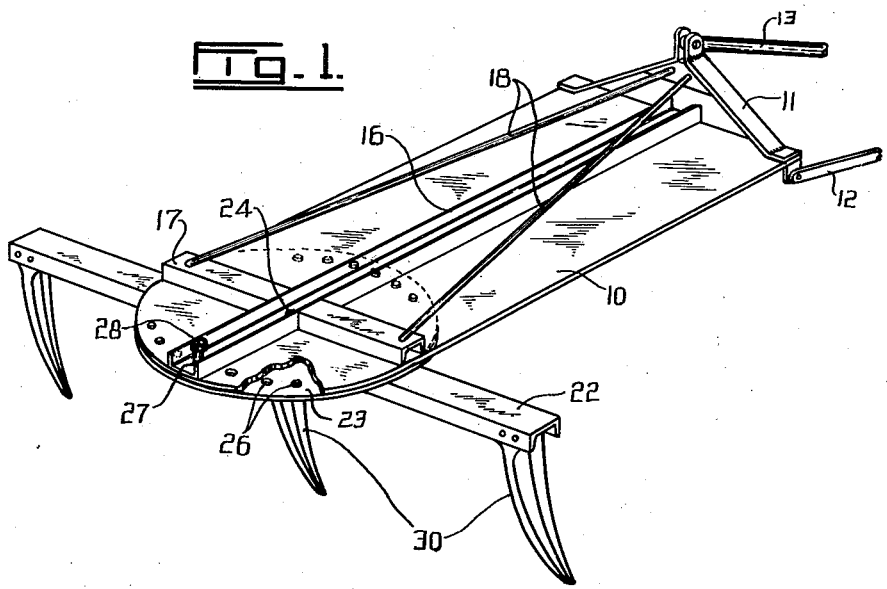
Figure 2:
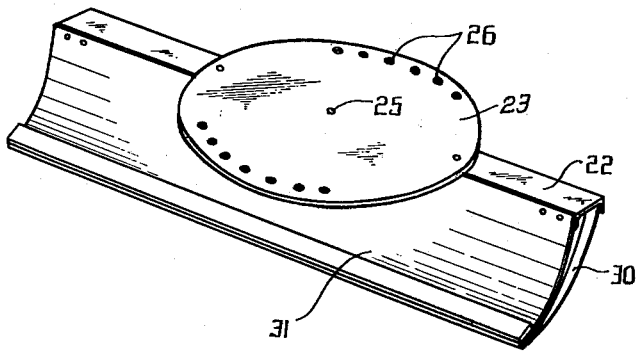

With these and other objects in view, the present invention consists essentially of an attachment for tractors comprising a plate adapted to be pivotally mounted at its inner end on a tractor, means on the pivot end of the plate through which the outer end of the latter may be raised and lowered from the tractor, a beam pivotally carried by the outer end of the plate, said beam being rotatable through a complete circle, a plurality of teeth projecting downwardly from the beam, and means for removably retaining the beam in any adjusted position, as more fully described in the following specification and illustrated in the accompanying drawings, in which Figure 1 is a perspective view of the attachment, and Figure 2 is a perspective view of part of the device with a blade connected thereto.

Referring more particularly to the drawings, 10 is a base plate having a brace 11 at its inner end, said brace extending upwardly from the sides of the plate and converging towards its top. The inner end of the plate is pivotally mounted on arms 12 which project outwardly from the rear of the tractor (not shown), while a tilting arm 13 also extends out from the tractor and is pivotally connected to the top of the brace 11. The arms 12 and 13 form part of the standard equipment of a tractor, and they may be raised or lowered independently of each other, while the arm 13 may be reciprocated to tilt the plate about its pivots and raise or lower its outer end.

The plate 10 has a stiffener 16 extending longitudinally thereof, and another stiffener 17 extending across its outer end. The stiffener 16 may be an inverted channel member, and the other stiffener a channel member facing the opposite way. Brace rods 18 extend from the outer ends of the cross stiffener 17 to the top of the brace 11.

A beam 22 is carried by and beneath the base plate 10 adjacent its outer end. The beam has a disc 23 secured to its upper surface, and it is connected to the plate by a pivot pin 24 which extends through an orifice 25 formed centrally of the disc so that the beam may be rotated through a complete circle. The disc has a plurality of holes 26 around its periphery adapted to register with a hole 27 in the base plate and its stiffener 16. With this arrangement, the beam may be held in any angularly adjusted position by a pin 28 removably extending through the hole 27 and one of the holes 26 in the disc.

A plurality of spaced arcuate teeth 30 project downwardly from the beam. These teeth are heavy at their upper ends and are firmly secured to the beam, while they taper down in a curve to points at their lower ends. A blade 31, see Figure 2, may be removably connected to the beam in front of the teeth in any suitable manner. This blade is curved in cross section to correspond with the curve of the teeth.

The attachment may be used with or without the blade 31, depending upon the type of work to be done. In either case, the teeth may face the tractor, as in Figure 1, or the beam may be swung around so that they face in the opposite direction. The beam is secured in any adjusted position by means of the pin 28. If the teeth face forwardly, the work is done while the tractor moves forwardly, but if they face in the opposite direction, the work is done while the tractor is in reverse. The arm 13 is reciprocated as desired to raise or lower the outer end of the base plate with the beam and its associated parts, and the arms 12 are raised or lowered to raise or lower either end of the beam, both these operations being normal practice with this type of tractor equipment. The teeth may be used alone for cultivating or tearing up rough ground or for pulling out roots, and the blade may be used for excavating or filling in holes. The teeth support the blade across its width so that it can stand very great strain. This blade is made wider than the tractor so that it can dig or scrape right up to a vertical wall.

What we claim as our invention is:

1. An attachment for tractors comprising a plate adapted to be pivotally mounted at its inner end on a tractor, a brace extending upwardly from the pivot end of the plate adapted to be connected to means from the tractor for raising and lowering the outer end thereof, a stiffener extending longitudinally of the plate, brace rods extending from points adjacent the outer end of the plate to the top of the brace, a beam pivotally mounted on and beneath said outer end, said beam being rotatable through a complete circle, a plurality of teeth projecting downwardly from the beam, and means for removably retaining the beam in any adjusted position.

2. An attachment for tractors comprising a plate adapted to be pivotally mounted at its inner end on a tractor, a brace extending upwardly from the pivot end of the plate adapted to be connected to means from the tractor for raising and lowering the outer end thereof, a stiffener extending longitudinally of the plate, another stiffener extending across the outer end of the plate, brace rods extending from the outer ends of the cross stiffener to the top of the brace, a beam pivotally mounted on and beneath the outer end of the plate, said beam being rotatable through a complete circle, a plurality of teeth projecting downwardly from the beam, a blade removably mounted on the beam in front of the teeth, and means for removably retaining the beam in any adjusted position.

GARNER LAVERNE ROBINSON.
ELDON LEWIS ROBINSON.

REFERENCES CITED

The following references are of record in the file of this patent:

UNITED STATES PATENTS

| Number | Name | Date |
| --- | --- | --- |
| 976,811 | Kloss | Nov. 22, 1910 |
| 1,119,248 | Daly | Dec. 1, 1914 |
| 1,704,922 | Pellette | Mar. 12, 1929 |
| 1,746,606 | Ray | Feb. 11, 1930 |
| 1,856,417 | Hyland | May 3, 1932 |
| 2,333,837 | Wibbels | Nov. 9, 1943 |
| 2,346,757 | Horner | Apr. 18, 1944 |